United States Patent
Wen

(10) Patent No.: US 8,719,467 B2
(45) Date of Patent: May 6, 2014

(54) METHOD, APPARATUS AND SYSTEM FOR MOUNTING FILE SYSTEM

(71) Applicant: Huawei Technologies Co., Ltd., Guangdong (CN)

(72) Inventor: Zhenghu Wen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/873,850

(22) Filed: Apr. 30, 2013

(65) Prior Publication Data

US 2013/0238679 A1  Sep. 12, 2013

Related U.S. Application Data

(63) Continuation of application No. 13/727,234, filed on Dec. 26, 2012, now abandoned, which is a continuation of application No. PCT/CN2011/078222, filed on Aug. 10, 2011.

(51) Int. Cl.
  *G06F 13/14* (2006.01)
  *G06F 17/30* (2006.01)

(52) U.S. Cl.
  USPC .................................. 710/36; 707/736

(58) Field of Classification Search
  CPC combination set(s) only.
  See application file for complete search history.

(56) References Cited

U.S. PATENT DOCUMENTS

| | | | | |
|---|---|---|---|---|
| 7,836,020 | B1 * | 11/2010 | Rao et al. | 707/649 |
| 2003/0046369 | A1 | 3/2003 | Sim et al. | |
| 2007/0260606 | A1 | 11/2007 | Yousif et al. | |
| 2010/0082622 | A1 * | 4/2010 | Irie et al. | 707/736 |
| 2010/0250825 | A1 | 9/2010 | Chen et al. | |
| 2011/0276706 | A1 * | 11/2011 | Chene et al. | 709/228 |
| 2012/0030427 | A1 * | 2/2012 | Hayakawa et al. | 711/118 |
| 2012/0209877 | A1 * | 8/2012 | Colclasure et al. | 707/770 |

FOREIGN PATENT DOCUMENTS

| | | |
|---|---|---|
| CN | 101232401 A | 7/2008 |
| CN | 101706822 A | 5/2010 |
| CN | 101799820 A | 8/2010 |

* cited by examiner

*Primary Examiner* — Ilwoo Park
(74) *Attorney, Agent, or Firm* — Leydig, Voit & Mayer, Ltd.

(57) ABSTRACT

The present invention belongs to the field of computer, and particularly provides a method, an apparatus and a system for mounting a file system. The method comprises: requesting, from a node mounted with a file system of a storage stack at the network distal end, for metadata corresponding to the mounting when the file system of the storage stack is to be mounted; receiving metadata transmitted by the node mounted with the file system of the storage stack, and caching the metadata in a memory; and mounting the file system of the storage stack according to the metadata; wherein the network bandwidth is larger than the IO bandwidth of the storage stack. The technical solutions provided by the present invention have the advantages that the time for mounting the file system is short and the reading and writing efficiency of the operating system is high.

4 Claims, 4 Drawing Sheets

METHOD, APPARATUS AND SYSTEM FOR MOUNTING FILE SYSTEM

CROSS-REFERENCE TO RELATED APPLICATIONS

This application is a continuation of U.S. patent application Ser. No. 13/727,234, filed Dec. 26, 2012, which is a continuation of International Patent Application No. PCT/CN2011/078222, filed on Aug. 10, 2011, both of which are hereby incorporated by reference in their entireties.

FIELD OF THE INVENTION

The present invention relates to the field of computer, and particularly, to a method, an apparatus and a system for mounting a file system.

BACKGROUND OF THE INVENTION

The file system is an important part of the operating system. It is generally required to mount the file system of a disk when read-write operations are to be made on the disk by the operating system. During the process of file system mounting, the metadata of a specific file system shall be read from the disk. The file system with a capacity of TB level or even PB level has numerous metadata, thus it usually spends certain time in mounting the file system.

In the method for mounting a file system in the prior art, metadata is usually requested from a disk where the file system is located. The metadata includes super block object, root directory and file control block of the root directory (to be noted, the above metadata is necessary, and in actual conditions the metadata may also include other unnecessary data). After those metadata is read into the memory, it is verified whether the read data is correct, and then the data is parsed one by one to generate a metadata structure in the memory.

According to the technical solution provided by the prior art, it is found that the prior art has the following technical problem.

The technical solution in the prior art mounts the file system by reading the metadata in the disk. But during the process of reading the metadata from the disk, a long time is required to read the metadata from the disk due to the limitation of the speed of the I/O interface of the disk, thus the overall time for mounting the file system is influenced and the reading and writing efficiency of the operating system is decreased.

SUMMARY OF THE INVENTION

The embodiments of the present invention provide a method for mounting a file system, so as to solve the problem of the method in the prior art that the reading and writing efficiency of the operating system is decreased.

The embodiments of the present invention provide a method for mounting a file system, comprising:

requesting, from a node mounted with a file system of a storage stack at the network distal end, for metadata corresponding to the mounting;

receiving metadata transmitted by the node mounted with the file system of the storage stack, and caching the metadata in a memory; and mounting the file system of the storage stack according to the metadata;

wherein the network bandwidth is larger than the IO bandwidth of the storage stack.

Another method for mounting a file system comprising:

receiving a mounting request from a network;

collecting metadata in a memory corresponding to the mounting request; and transmitting the metadata corresponding to the mounting request via the network.

The embodiments of the present invention provide an apparatus for mounting a file system, comprising:

a request mounting unit configured to request, from a node mounted with a file system of a storage stack at the network distal end, for metadata corresponding to the mounting;

a receiving and caching unit configured to receive metadata transmitted by the node mounted with the file system of the storage stack, and cache the metadata in a memory;

a mounting operation unit configured to mount the file system of the storage stack according to the metadata, wherein the network bandwidth is larger than the IO bandwidth of the storage stack.

Another apparatus for mounting a file system comprising:

a network receiving unit configured to receive a mounting request from a network side;

a collecting unit configured to collect metadata in the memory corresponding to the mounting request; and a network transmitting unit configured to transmit the metadata in the memory corresponding to the mounting request through the network.

Furthermore, the embodiments of the present invention provide a system for mounting a file system, comprising: a normal node and a node mounted with the file system, wherein the normal node and the node mounted with the file system are connected to each other through a network, and the network bandwidth is larger than the IO bandwidth of the storage stack of the normal node;

the normal node is configured to request, from the node mounted with the file system at the network distal end, for metadata corresponding to the mounting, when the file system of a storage stack is to be mounted;

the node mounted with the file system is configured to collect the metadata in a memory corresponding to the mounting and transmit the metadata through the network;

the normal node is further configured to receive the metadata corresponding to the mounting, cache the metadata in the memory, and mount the file system of the storage stack according to the metadata.

As compared with the prior art, the present invention has the following beneficial effects: the embodiments of the present invention obtain the metadata through a high-speed network; since the method needs not to obtain the metadata through the disk, it does not require operations such as disk or magnet seek. Thus the present invention has the advantages of saving the time for mounting the file system and improving the reading and writing efficiency of the operating system.

DETAILED DESCRIPTION OF THE PREFERRED EMBODIMENTS

Figure 1:
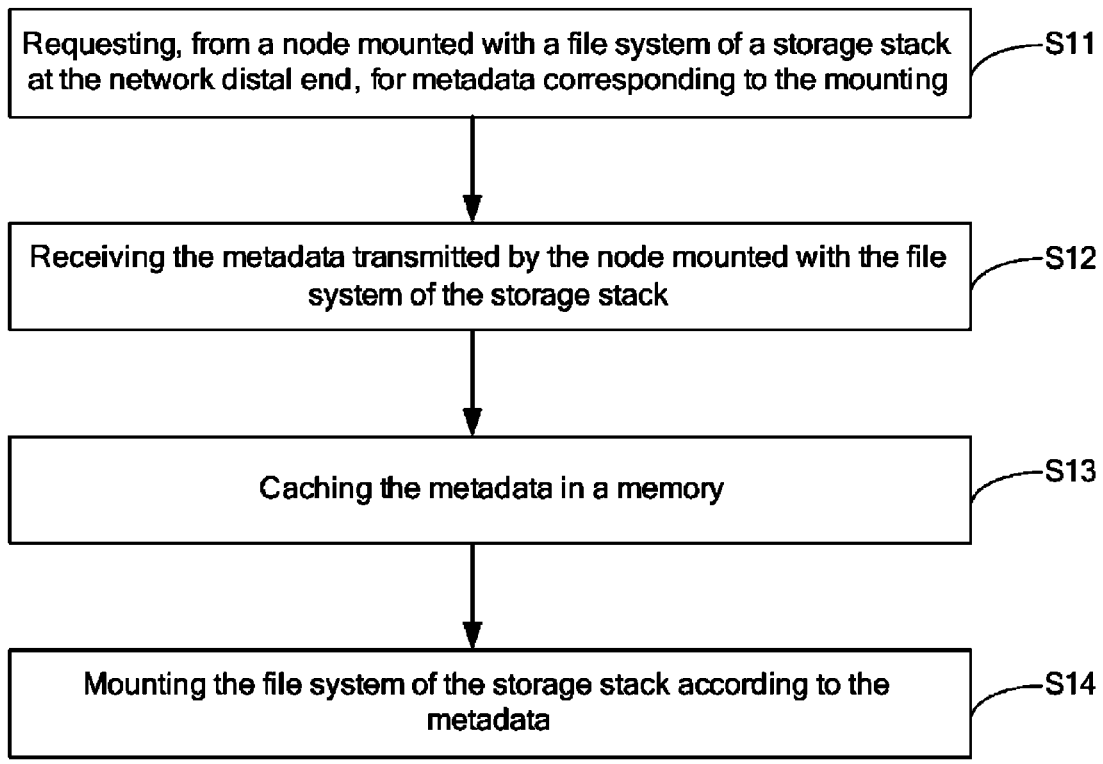
FIG. 1 is a flowchart of a method for mounting a file system provided by a specific embodiment of the present invention.

The specific embodiments of the present invention provide a method for mounting a file system, and such method is completed by the node in a network. To be noted, the network protocol may be any high-speed network protocol such as Infiniband, TCP/IP, Quadrics Elan, Myrinet (MX and GM) and Cray. The method is illustrated in FIG. 1, including the following steps:

S11: requesting, from a node mounted with a file system of a storage stack at the network distal end, for metadata corresponding to the mounting;

S12: receiving the metadata transmitted by the node mounted with the file system of the storage stack;

S13: caching the metadata in a memory;

S14: mounting the file system of the storage stack according to the metadata.

To be noted, the storage stack specifically may be a disk, and certainly also may be a magnet.

In addition, in the above method the network bandwidth shall be larger than the IO bandwidth of the storage stack.

When mounting a file system, the method provided by the specific embodiment of the present invention requests, from a node mounted with the file system in the network, for metadata corresponding to the mounting, and mounts the file system according to the obtained metadata. The above network bandwidth is larger than the disk IO bandwidth, so the metadata obtaining speed of the method is faster than that of the disk, and the method has the advantage of time saving. Since the method obtains the metadata through network, it does not require operations such as disk or magnet seek as compared with obtaining the metadata through disk or magnet. Thus the method has the advantages of operation reduction and time saving. In addition, as the method obtains the metadata from a memory of the node mounted with the file system of the storage stack and the metadata is cached in a local memory, it needs not to read the metadata in the storage stack, and has the advantage of further time saving. Therefore, the method provided by the specific embodiment of the present invention has the advantages of short time for mounting the file system and high reading and writing efficiency of the operating system.

To be noted, there may be one or more nodes mounted with the file system of the storage stack, and the number of nodes is not limited in the specific embodiment of the present invention.

To be noted, the method for implementing step S14 specifically may be any one of the following modes:

Mode A: when a request for metadata of the storage stack is initiated, filling the request for metadata with the metadata cached in the memory, then parsing the metadata and mounting the file system of the storage stack by using the parsed metadata.

Mode B: obtaining the mounted metadata from the storage stack, judging the arrival time of disk metadata (obtained by reading the storage stack) and network metadata (obtained through the network), parsing the metadata that arrives earlier, and mounting the file system of the storage stack by using the parsed metadata.

To be noted, in mode B, the operation of obtaining the mounted metadata from the storage stack may be performed simultaneously with step S12.

Figure 2:
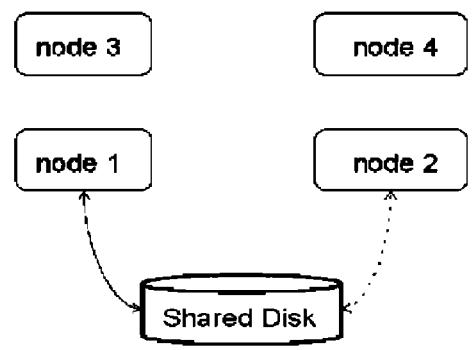
FIG. 2 is a network connection diagram provided by an embodiment of the present invention.
Figure 3:
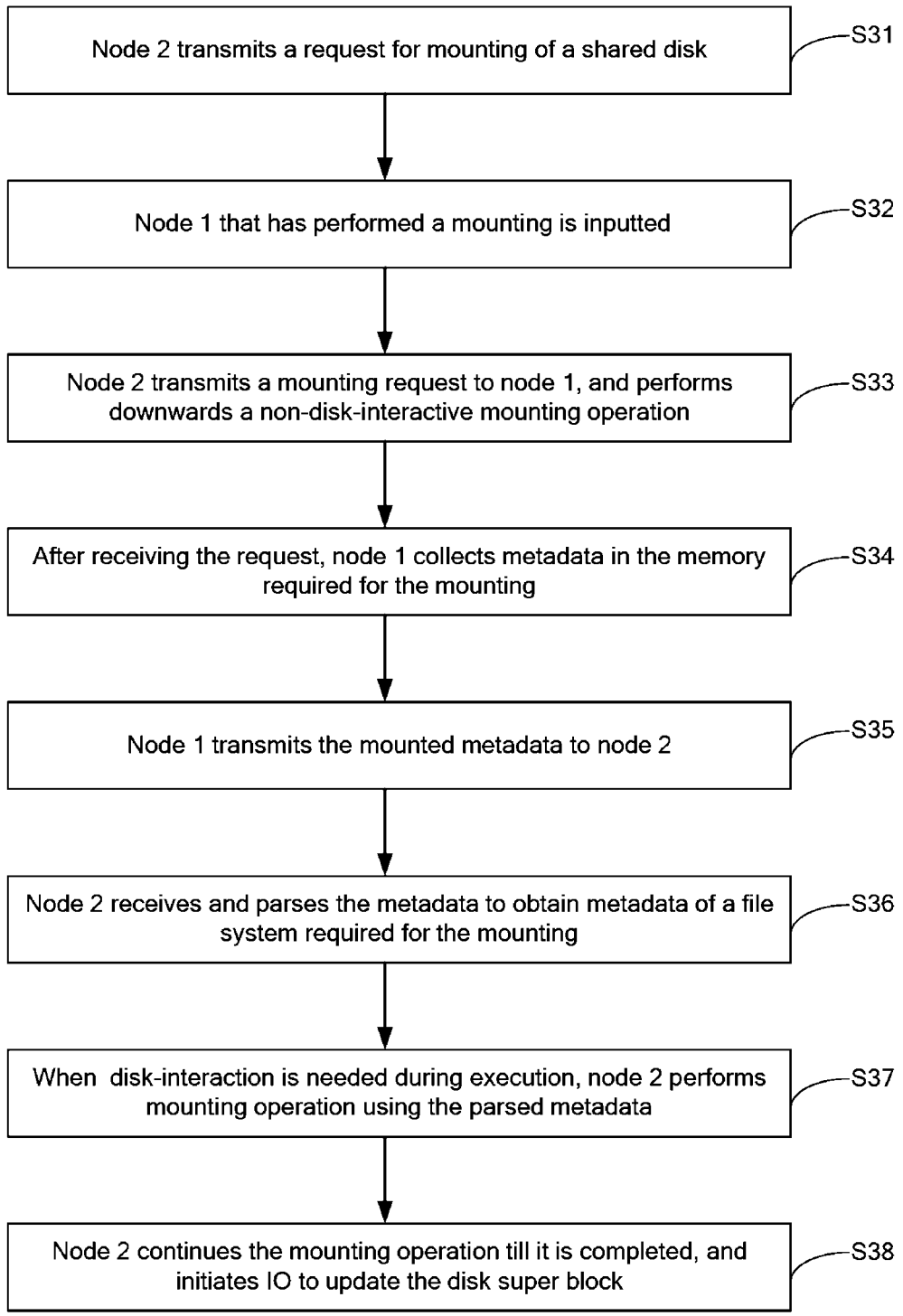
FIG. 3 is a flowchart of a method for mounting a file system provided by an embodiment of the present invention.

The present invention provides an embodiment that is accomplished in the following technical scenario. The embodiment gives an example in which double-nodes in the network share and mount the same disk file system, and the network structure of the embodiment is illustrated in FIG. 2. It is assumed that there are four nodes in the network, i.e., node 1, node 2, node 3 and node 4 connected to each other through the high speed network, and the network protocol may be any of Infiniband, TCP/IP, Quadrics Elan, Myrinet (MX and GM) and Cray, etc. In which, node 1 and node 2 may require mounting the file system in the shared disk. For the convenience of description, assuming that node 1 has already been mounted with the file system in the shared disk through a certain mode, and node 2 is a node that requires mounting the file system. The specific flow of a method for mounting a file system provided by this embodiment is illustrated in FIG. 3, including the following steps.

S31: node 2 transmits a request for mounting a shared disk;

S32: node 1 that has performed a mounting is inputted;

To be noted, the inputting manner may be a manual input, or the network searches node 1 automatically, which is not limited by the present invention.

S33: node 2 transmits a mounting request to node 1, and performs downwards a non-disk-interactive mounting operation;

S34: after receiving the request, node 1 collects metadata in the memory required for the mounting;

S35: node 1 transmits the mounted metadata to node 2;

S36: node 2 receives and parses the metadata to obtain metadata of a file system required for the mounting, such as super block, block group descriptor, root directory and index node;

S37: when it is requested to obtain metadata, node 2 performs a mounting operation using the parsed metadata;

S38: node 2 continues the mounting operation till it is completed.

In the method provided by the embodiment, node 2 obtains the metadata of node 1 through the network, and performs a mounting according to the metadata. Since the metadata is obtained completely through the network, the method does not need a disk seeking operation or multiple IO operations, and has the advantages of short time for mounting the file system and high reading and writing efficiency of the operating system.

Figure 4:
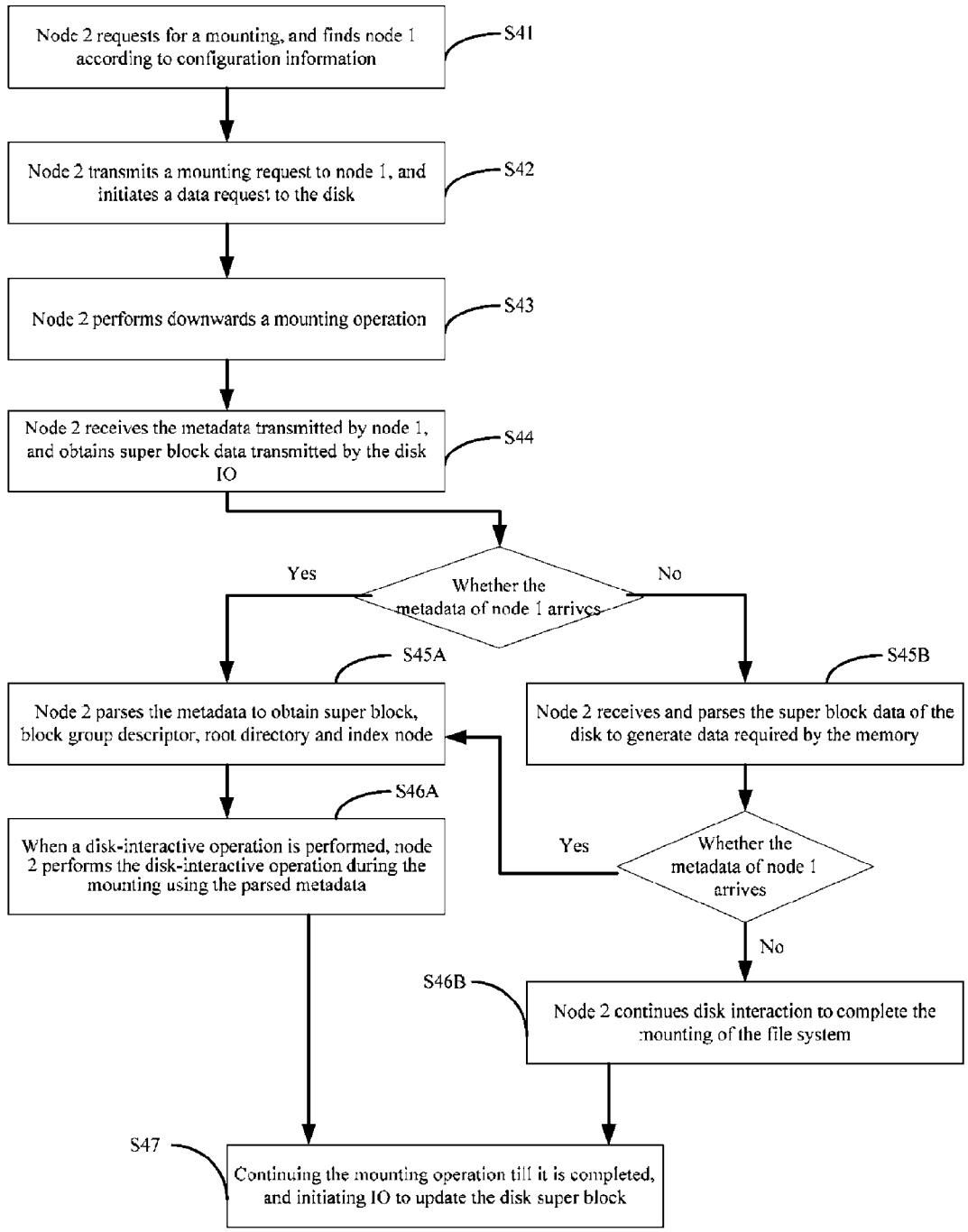
FIG. 4 is a flowchart of a method for mounting a file system provided by another embodiment of the present invention.

The present invention further provides an embodiment that is accomplished in a technical scenario the same as that of the first embodiment. The specific flow of a method for mounting a file system provided by this embodiment is illustrated in FIG. 4, including the following steps.

S41: node 2 requests for a mounting, and finds node 1 according to configuration information;

S42: node 2 transmits a mounting request to node 1, and initiates a data request to the disk;

S43: node 2 performs downwards a mounting operation (non-disk-interactive operation);

S44: node 2 receives the metadata transmitted by node 1, and meanwhile obtains super block data transmitted by the disk IO;

It is judged whether the received metadata of node 1 arrives, if yes, enter S45A, S46A and S47; if not, enter S45B to S46B.

S45A: node 2 parses the metadata to obtain super block, block group descriptor, root directory, index node, etc.

S46A: during a disk-interactive operation, node 2 performs the disk-interactive operation during the mounting by using the parsed metadata;

S45B: node 2 receives and parses the super block data of the disk to generate data required by the memory, judges again whether the metadata of node 1 to be received arrives or not, if yes, performs S45A, S46A and S47, otherwise, performs S46B and S47;

S46B: node 2 continues disk interaction to complete the mounting of the file system;

S47: continuing the mounting operation till it is completed.

In the method provided by the embodiment, node 2 not only obtains the metadata of node 1 through the network, but also obtains the metadata through the disk, and selects the metadata arriving earlier to perform the mounting operation, thus the method has the advantage of optimizing the operation.

Figure 5:
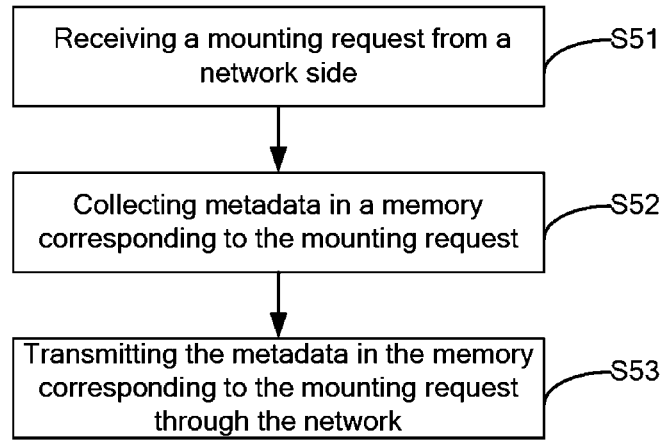
FIG. 5 is a flowchart of a method for transmitting metadata of a file system provided by a specific embodiment of the present invention.

The specific embodiment of the present invention further provides a method for transmitting metadata of a file system, which is completed by a node in the network mounted with a file system of a storage stack, as illustrated in FIG. 5, including:

S51: receiving a mounting request from the network side;

S52: collecting metadata in a memory corresponding to the mounting request;

S53: transmitting the metadata in the memory corresponding to the mounting request through the network.

The transmitting method provided by the specific embodiment of the present invention supports the implementation of the above method for mounting the file system, so that the method for mounting the file system has the advantages that the time for mounting the file system is short and the reading and writing efficiency of the operating system is high.

Figure 6:
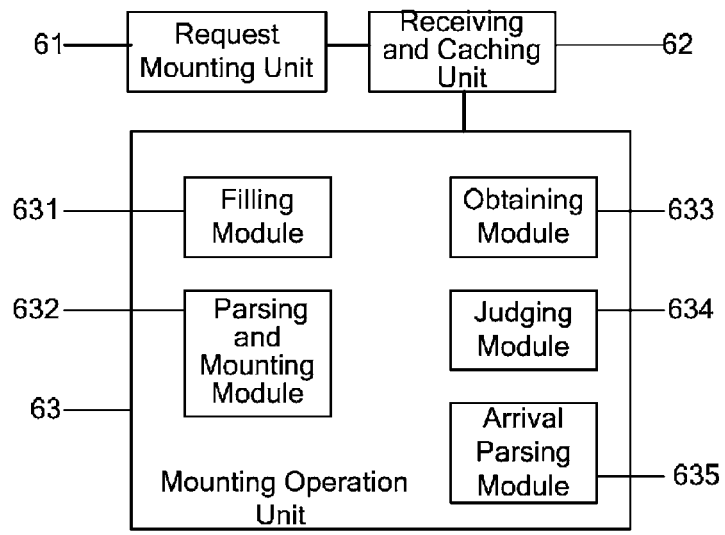
FIG. 6 is a structure diagram of an apparatus for mounting a file system provided by a specific embodiment of the present invention.

The specific embodiment of the present invention further provides an apparatus for mounting a file system, as illustrated in FIG. 6, including:

a request mounting unit 61 configured to request, from a node mounted with a file system of a storage stack at the network distal end, for metadata corresponding to the mounting;

a receiving and caching unit 62 configured to receive metadata transmitted by the node mounted with the file system of the storage stack, and cache the metadata in a memory; and a mounting operation unit 63 configured to mount the file system of the storage stack according to the metadata;

wherein, the above network bandwidth is larger than IO bandwidth of the storage stack.

Alternatively, the mounting operation unit 63 may include:

a filling module 631 configured to fill a request for metadata of the storage stack with the metadata cached in the memory when the request is initiated; and a parsing and mounting module 632 configured to parse the metadata and mount the file system of the storage stack using the parsed metadata.

Alternatively, the mounting operation unit 63 may include:

an obtaining module 633 configured to obtain the mounted metadata from the storage stack while receiving the metadata transmitted by the node mounted with the file system of the storage stack;

a judging module 634 configured to judge the arrival time of disk metadata and network metadata; and an arrival parsing module 635 configured to parse the metadata that arrives earlier judged by the judging module, and mount the file system of the storage stack using the parsed metadata.

When mounting a file system, the apparatus provided by the specific embodiment of the present invention requests, from a node in the network mounted with the file system, for metadata corresponding to the mounting, and mounts the file system according to the obtained metadata. The above network bandwidth is larger than the IO bandwidth of the disk, so the metadata obtaining speed of the apparatus is faster than that of the disk, and the apparatus has the advantage of time saving. Since the apparatus obtains the metadata through network, it does not require operations such as disk or magnet seek as compared with obtaining the metadata through disk or magnet. Thus the apparatus has the advantages of operation reduction and time saving. In addition, as the apparatus obtains the metadata from a memory of the node mounted with the file system of the storage stack and the metadata is cached in a local memory, it needs not to read the metadata in the storage stack, and has the advantage of further time saving. Therefore, the apparatus provided by the specific embodiment of the present invention has the advantages that the time for mounting the file system is short and the reading and writing efficiency of the operating system is high.

Figure 7:
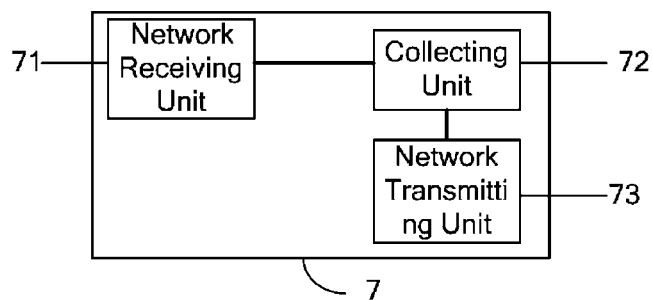
FIG. 7 is a structure diagram of an apparatus for transmitting metadata of a file system provided by a specific embodiment of the present invention.

The specific embodiment of the present invention further provides an apparatus for transmitting metadata of a file system, as illustrated in FIG. 7, including:

a network receiving unit 71 configured to receive a mounting request from the network side;

a collecting unit 72 configured to collect metadata in the memory corresponding to the mounting request; and a network transmitting unit 73 configured to transmit the metadata in the memory corresponding to the mounting request through the network.

The transmitting apparatus provided by the specific embodiment of the present invention supports the implementation of the above apparatus for mounting the file system, so that the apparatus for mounting the file system has the advantages that the time for mounting the file system is short and the reading and writing efficiency of the operating system is high.

The present invention further provides a system for mounting a file system, including a normal node and a node mounted with the file system connected to each other through a network, and the network bandwidth is larger than the IO bandwidth of the storage stack of the normal node.

The normal node is configured to request, from the node mounted with the file system at the network distal end, for metadata corresponding to the mounting, when the file system of the storage stack is to be mounted.

The node mounted with the file system is configured to collect the metadata in the memory corresponding to the mounting and transmit the metadata via the network.

The normal node is further configured to receive the metadata corresponding to the mounting, cache the metadata in the memory, and mount the file system of the storage stack according to the metadata.

To be noted, there may be one or more normal nodes, and the there also may be one or more nodes mounted with the file system. The numbers of those nodes are not limited in the specific embodiment of the present invention.

When mounting a file system, the system provided by the specific embodiment of the present invention requests, from the node mounted with the file system in the network, for metadata corresponding to the mounting, and mounts the file system according to the obtained metadata. Since the system obtains the metadata through network, it does not require operations such as disk or magnet seek as compared with obtaining the metadata through disk or magnet. Thus the system has the advantages of operation reduction and time saving. In addition, the above network bandwidth is larger than the disk IO bandwidth, so the metadata obtaining speed of the system is faster than that of the disk, and the system has the advantage of further time saving. Further, as the system obtains the metadata from a memory of the node mounted with the file system of the storage stack and the metadata is cached in a local memory, it needs not to read the metadata in the storage stack, and has the advantage of further time saving. Therefore, the system provided by the specific embodiment of the present invention has the advantages that the time for mounting the file system is short and the reading and writing efficiency of the operating system is high.

In conclusion, the technical solutions provided by the specific embodiments of the present invention have the advantages that the mounting time is saved and the reading and writing efficiency of the operating system is high.

In the above system embodiment, the modules or units are just classified based on the functional logics, but not limited thereto once corresponding functions can be realized. In addition, the specific titles of the functional modules are just given for the convenience of distinguishing them from each other, rather than limiting the protection scope of the present invention.

A person skilled in the art shall be appreciated that all or a part of steps of the non-linear tolerance compensation method provided by the embodiments of the present invention may be completed by instructing relevant hardware through a program, e.g., by running the program with a computer. The program may be stored in a readable storage medium such as RAM, magnetic disk, optical disk, etc.

What is claimed is:

1. A method for mounting a file system, the method comprising:
    requesting, via a network and from a node mounted with a file system of a storage stack at a network distal end, for metadata corresponding to the mounting;
    receiving the metadata transmitted by the node mounted with the file system of the storage stack, and caching the metadata in a memory;
    mounting the file system of the storage stack according to the metadata; wherein the network bandwidth is larger than an IO bandwidth of the storage stack; and
    obtaining disk metadata that comprises the mounted metadata from the storage stack while receiving network metadata transmitted by the node mounted with the file system of the storage stack, judging arrival time of the disk metadata and the network metadata, parsing either the disk metadata or the network metadata, whichever arrives earlier, and mounting the file system of the storage stack using the parsed metadata.

2. The method according to claim 1, wherein mounting the file system of the storage stack according to the parsed metadata comprises:
    when requesting for metadata of the storage stack is initiated, filling the request with the metadata cached in the memory; then parsing the metadata and mounting the file system of the storage stack using the parsed metadata.

3. An apparatus for mounting a file system, the apparatus comprising:
    a request mounting unit configured to request, from a node mounted with a file system of a storage stack at a network distal end, for metadata corresponding to the mounting;
    a receiving and caching unit configured to receive metadata transmitted by the node mounted with the file system of the storage stack, and cache the metadata in a memory; and
    a mounting operation unit configured to mount the file system of the storage stack according to the metadata, wherein the network bandwidth is larger than an IO bandwidth of the storage stack, wherein the mounting operation unit comprises:
        an obtaining module configured to obtain disk metadata that comprises the mounted metadata from the storage stack while receiving network metadata transmitted by the node mounted with the file system of the storage stack;
        a judging module configured to judge the arrival time of the disk metadata and the network metadata; and
        an arrival parsing module configured to parse either the disk metadata or the network metadata, whichever arrives earlier as judged by the judging module, and mount the file system of the storage stack using the parsed metadata.

4. The apparatus according to claim 3, wherein the mounting operation unit comprises:
    a filling module configured to fill a request for metadata of the storage stack with the metadata cached in the memory when the request is initiated; and
    a parsing and mounting module configured to parse the metadata and mount the file system of the storage stack using the parsed metadata.

* * * * *

UNITED STATES PATENT AND TRADEMARK OFFICE
CERTIFICATE OF CORRECTION

PATENT NO.       : 8,719,467 B2                         Page 1 of 1
APPLICATION NO.  : 13/873850
DATED            : May 6, 2014
INVENTOR(S)      : Wen It is certified that error appears in the above-identified patent and that said Letters Patent is hereby corrected as shown below:

*Title page, Applicant's City of Residence "Guangdong (CN)" should read --Shenzhen (CN)--.*

Signed and Sealed this
Ninth Day of September, 2014

Michelle K. Lee
*Deputy Director of the United States Patent and Trademark Office*